Nov. 6, 1951 G. A. GRADY ET AL 2,574,327
TRACTION DEVICE FOR AUTOMOTIVE TIRES
Filed Sept. 25, 1948 2 SHEETS—SHEET 1
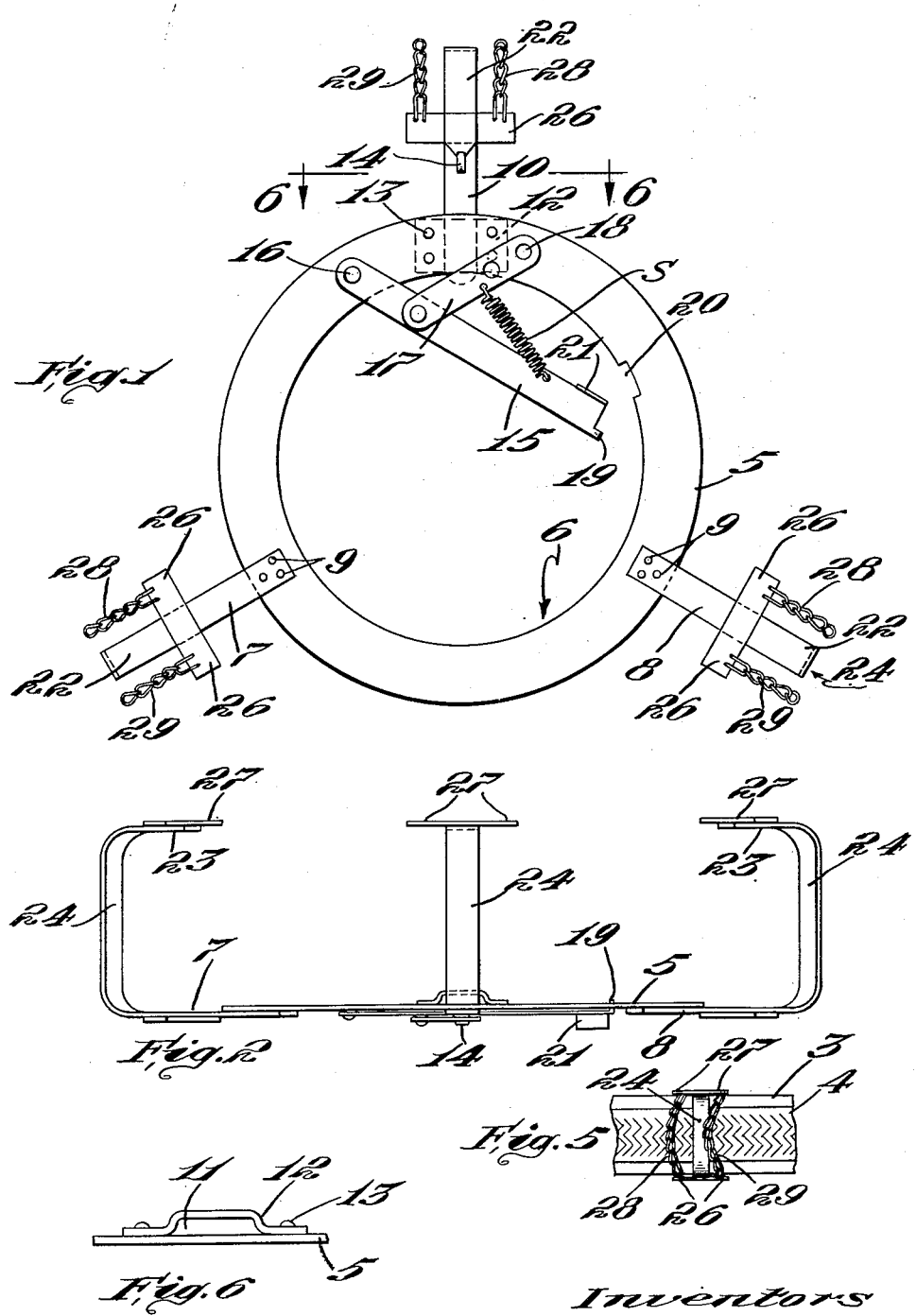
Inventors
George A. Grady
Joseph M. Walsh
by Roberts Cushman
Attys.

Nov. 6, 1951     G. A. GRADY ET AL     2,574,327
TRACTION DEVICE FOR AUTOMOTIVE TIRES
Filed Sept. 25, 1948     2 SHEETS—SHEET 2
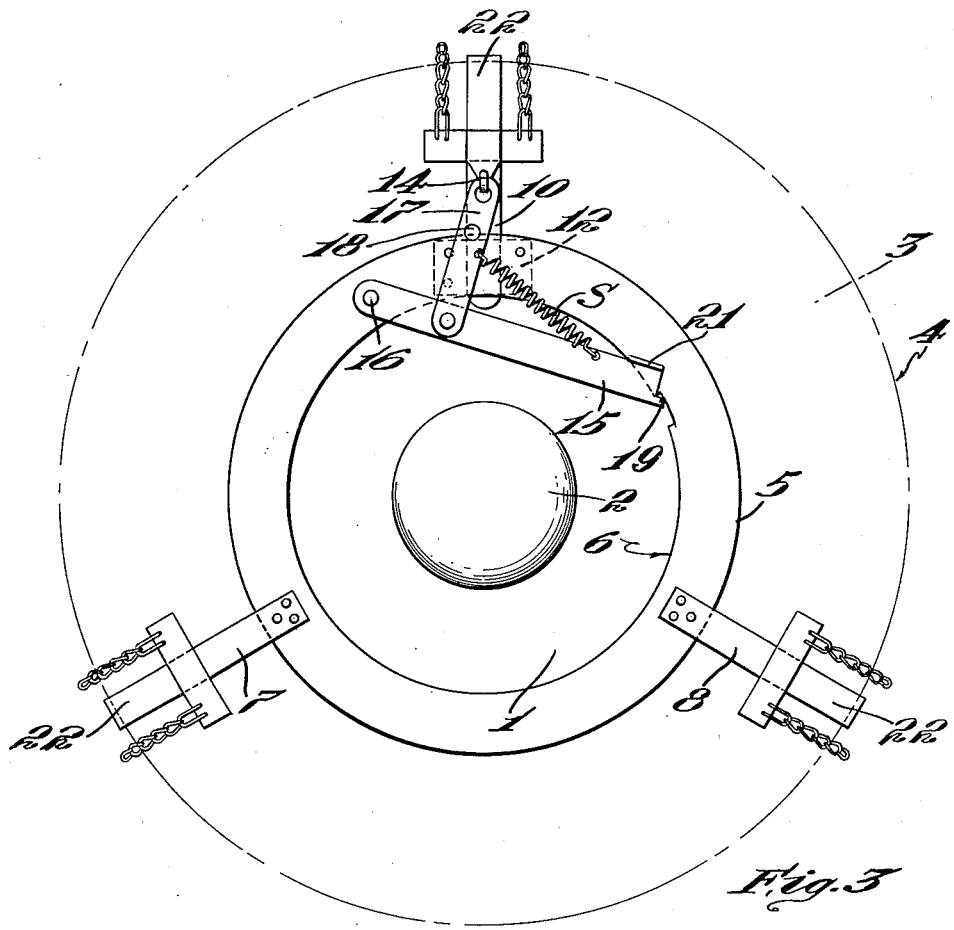
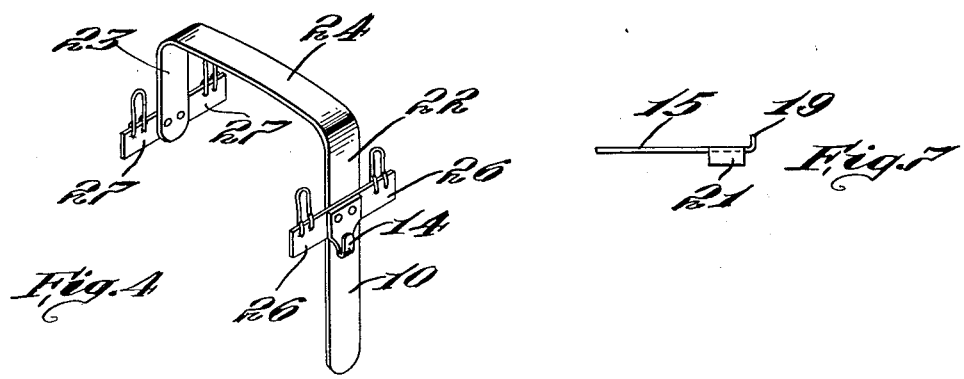
Inventors
George A. Grady
Joseph M. Walsh Patented Nov. 6, 1951

2,574,327

UNITED STATES PATENT OFFICE 2,574,327

TRACTION DEVICE FOR AUTOMOTIVE TIRES

George A. Grady, Boston, and Joseph M. Walsh, Roslindale, Mass.

Application September 25, 1948, Serial No. 51,154

4 Claims. (Cl. 152—223)

This invention pertains to removable traction devices for use with automotive tires. The customary tire chain, when once applied, provides reasonably good and substantially uniformly distributed traction, but it is heavy (particularly in the larger sizes), unpleasant and hard to handle and difficult to apply, especially under those emergency conditions where it is most needed, to wit, when the car is stalled by sand, deep mud or snow and in places where a jack cannot readily be used. When the motor vehicle travels alternately over good, clear roads and over roads where the traction is poor, by reason of steepness, sand, mud, ice or snow, it is desirable to use the usual tire chain, only on the poor roads, since the use of chains on hard-surfaced modern roads, at usual rates of speed, produces a disagreeable noise and vibration and results in very rapid wear of the chain. However, the difficulty of application and removal of conventional chains is so great that many persons, because of inability, laziness, or non-ownership of the vehicle, will allow chains to remain on the wheels while traveling for long distances over clear roads, resulting in rapid deterioration of the chain, as above suggested.

Because of the above difficulties in respect to complete chains, as well as the initial cost of such devices, many persons prefer to rely upon the so-called snap-chains (single traction bands, strapped or otherwise secured about the tire). Such snap-chains, while less cumbersome and somewhat easier to apply than complete chains, afford but little useful traction effect. Being located at a single point on the periphery of the tire, such a snap-chain engages the ground but once for each rotation of the wheel, producing a sudden violent push which places a great strain on the driving mechanism of the vehicle and tending to gouge out the surface on which the wheel rests, rather than to propel the vehicle forwardly. Furthermore, when a single such snap-chain is applied to the wheel, there results a very pronounced vibration and an effect upon the occupant of the vehicle suggestive of that produced when the vehicle is traveling over a "wash-board" road surface. To apply a series of such snap-chains to each drive wheel involves about as much trouble as the application of a full chain, while the attaching devices for securing such snap-chains in place are often so insecure that after a very short period of use the snap-chain comes off and is lost.

It has heretofore been proposed to provide added traction for a vehicle by the use of a plurality of rigid claws or "mud lugs" usually spaced equally about the periphery of the tire and so connected as to permit them to be applied and removed as a unit. However, such devices have proven impractical, in particular because the several claws are rigidly connected, so that each claw always contacts substantially the same point on the tread of the tire, thus so localizing the pressure upon the tire as to cause a rapid break-down in the tire structure.

The present invention has for its principal object the provision of a simple, relatively inexpensive and easily applied traction device which, when applied to the vehicle tire, provides ample traction, the traction elements being arranged symmetrically about the periphery of the tire and having the characteristics of the loose cross-chains of the usual tire chain, thereby avoiding localization of pressure on the tire tread. A further object is to provide a traction device employing a plurality of cross-chains, as the road-engaging traction elements, connected to each other so that they may be applied and removed as a unit but so devised that the traction device may be applied from the outside of the wheel and without necessitating the lifting of the tire from the ground or the forward or rearward movement of the vehicle as a step in the application of the device. A further object is to provide a traction device which may be applied very readily even though the vehicle tire be partially embedded in sand, mud or snow. A further object is to provide a traction device which is slight in weight so that it may readily be handled by any person capable of driving a motor vehicle; which may be securely clamped in place by the movement of a single part and without the use of tools; and which may be as readily removed. A further object is to provide a traction device which occupies but little space when not in use so that it may be carried in the trunk of a passenger automobile and which may thus always be available for use under emergency conditions. Other and further objects and advantages of the invention will be pointed out in the following more detailed description and by reference to the accompanying drawings wherein:

Fig. 1 is a side elevation of the traction device as it appears before application to the automobile wheel;

Fig. 2 is a plan view of the device shown in Fig. 1 but omitting the chains;

Fig. 3 is a side elevation of the device operatively assembled with an automobile wheel;

Fig. 4 is a perspective view of one the chain carriers;

Fig. 5 is a fragmentary plan view, to smaller scale, of an automobile tire showing one of the chain carriers of the improved traction device assembled with the tire and indicating the position which the chains assume during use;

Fig. 6 is a fragmentary section, to larger scale in a plane indicated by the line 6—6 of Fig. 1, showing a guide bracket for one of the chain carriers; and Fig. 7 is a fragmentary plan view of the locking device.

Referring to the drawings, the numeral 1 designates the wheel of an automotive vehicle having the hub cap 2 and carrying the tire 3 having the tread 4.

The traction device of the present invention is designed to be applied at the outside of the wheel, that is to say that side of the wheel which is remote from the vehicle body. When the terms "inner" and "outer" are here used they are intended in this sense, to wit: "outer" refers to directions away from the vehicle body and "inner" to a direction toward the vehicle body.

As illustrated, the device comprises an annulus 5 (Fig. 1) having a central opening bounded by the edge 6, this central opening being of a diameter greater than that of the hub cap 2. The outside diameter of the annulus may be varied in accordance with the size of the wheel to which the device is to be applied, but an outside diameter of approximately 18 inches is acceptable for use with the wheels of most passenger automobiles. This annulus 5 is preferably made from sheet metal, for example an aluminum alloy or stainless steel which does not readily corrode and which has substantial stiffness and tensile strength and which resists bending. Sheet metal of a thickness of approximately ⅛ inch would be suitable for the purpose and the radial width of the annulus between its inner and outer edges may be of the order of 2 inches. It is to be understood that the invention is not limited to specific materials here suggested, nor to the dimensions referred to, but that these are cited merely by way of example of an acceptably operative device.

Two rigid arms 7 and 8 project radially from the outer edge of this annulus. These arms may be integral with the annulus if desired, but as here illustrated are separate pieces firmly fixed to the annulus, for example by rivets 9 or by welding. These arms 7 and 8 may be made of the same material as the annulus itself, and as illustrated in Fig. 1 are spaced apart an angular distance of approximately 120°.

A third radial arm 10 is arranged at approximately 120° from each of the arms 7 and 8. This radial arm 10 is disposed in a socket 11 (Fig. 6) here shown as formed by a rigid strap member 12 secured at its opposite ends by rivets 13 to the annulus, this strap providing the socket or guideway 11 in which the arm 10 may slide radially.

While as here illustrated three radial arms are provided, disposed at 120° apart about the periphery of the annulus, it is to be understood a greater or lesser number of arms may be employed within the scope of the invention, at least one of the arms being capable of movement to facilitate the application of the device to the tire.

As shown in Figs. 1, 2, 3 and 4, the arm 10 is provided with a hook 14 at its outer side. An elongate lever 15 is pivotally secured at 16 to the outer face of the annulus 5. The pivotal connection may be loose enough to permit slight in and out movement of the lever, or preferably the lever may be resilient with a tendency to lie flat against the outer face of the annulus. A link 17 is pivoted at one end to the lever 15 at a point intermediate the ends of the latter. The link 17 has one or more openings 18 (preferably a plurality of such openings) designed selectively to be engaged over the hook 14 so as to connect the arm 10 to the lever 15. A tension spring S connects the free end portion of the link 17 to the right-hand end portion of the lever 15 as illustrated in Figs. 1 and 2.

The lever 15 is provided near its free right-hand end with an inwardly directed locking latch 19 which is designed, at times, to engage a notch 20 at the inner edge 6 of the annulus 5. Near its right-hand end (as shown in Fig. 1) the lever 15 is provided with an outwardly directed lug 21 constituting means for actuating the lever by the hand or foot.

Each of the arms 7, 8 and 10 has rigidly secured to it (either integrally or otherwise) a chain carrier, here shown as an elongate strip of stiff shape-retaining metal bent to U-shape and having the parallel legs 22 and 23 united by a bend 24 of such shape or radius of curvature as to space the legs 22 and 23 far enough apart to receive the tire 3 between them.

As illustrated in Fig. 4, the leg 22 of the upper chain carrier is integral and aligned with the radial arm 10. The outer legs 22 of the other chain carriers are similarly connected to the radial arms 7 and 8 respectively.

Each of the chain carriers is provided with a pair of laterally projecting anchorage lugs 26 rigidly fixed to the lower part of its outer arm 22, and the leg 23 of each of the chain carriers is likewise provided with oppositely directed anchorage lugs 27.

Each chain carrier has attached to it a pair of chains 28 and 29 respectively, these chains being disposed at opposite sides of the bend 24 of the carrier and having their opposite ends attached to the lugs 26 and 27 of the carrier. These chains 28 and 29 are of such length, between their connections to the anchorages 26 and 27, that when the device is applied to the tire the chains extend loosely across the tread portion of the tire so that the central portions of the chains are free to move peripherally of the tire during use. To insure this effect, the length of each chain between its points of attachment to the anchorage lugs 26 and 27 should be greater than the peripheral extent of the legs 22 and 23 and the bend 24 of the carrier between the points of attachment of the chains. As indicated in Fig. 2 the lengths of the legs 22 and 23 of the carrier are such that the anchorage lugs 26 and 27 are located at the opposite side walls of the tire.

In using the device, and assuming that the parts are in the position shown in Fig. 1, the arm 10 may, if desired, be completely withdrawn from the socket 11, although this is not always necessary. The chain carriers mounted on the arms 7 and 8 may then be hooked beneath the vehicle tire, at points above its contact with the ground, and then the chain carrier carried by the arm 10 may be hooked over the upper part of the tire and inserted in the socket 11, or, if it has not been completely withdrawn from the socket in applying it to the tire, it is pulled out far enough to hook it over the tire. The lever 15 is now raised to permit one of the openings 18 in the link 17 to receive the hook 14. The operator then swings the lever 15 downwardly, either by hand or by foot, until the locking latch 19 is below the inner edge 6 of the annulus, whereupon the locking lug is pushed back or automatically springs into engagement with the notch 20, the spring 18 then holding the lever 15 in the locking position. With the parts thus arranged, the chains of each carrier extend across the tread of the tire, as shown in Fig. 5, the bends 24 of the several chain carriers spanning the tire. Since the chains are loose they take some such position as shown in Fig. 5 during the operation of the vehicle, moving back and forth in accordance with the contour of the roadway so that they do not contact the tire always at the same point and usually overlying the corresponding bend 24 of the carrier, thus protecting the latter from wear against the road surface.

When it is desired to remove the device it is merely necessary to press down on the actuating lug 21, either by hand or by foot until the locking latch 19 can be disengaged from the notch 20, whereupon the lever 15 may be pulled outwardly and then allowed to swing up, so that link 17 may be unhooked, permitting the arm 10 to slide radially up to release the upper chain carrier from the tire and so that the entire device may be withdrawn from the wheel as a unit.

Because the device is so easily applied, without recourse to the use of a jack or the employment of tools, it substantially does away with the customary reluctance of the car operator to apply and remove the traction device as conditions demand, and make it useful for such short periods as in driving a car up a steep private driveway.

While one desirable embodiment of the invention has been illustrated by way of example, it is understood that the invention is broadly inclusive of any and all modifications falling within the appended claims.

We claim:

1. A traction device for use with the tire of an automobile wheel, said device comprising a rigid annulus, designed to be located at the outside of and substantially coaxial with the wheel, three rigid radial arms associated with the annulus, said arms being spaced 120° apart from each other, the inner ends of two of the arms being permanently fixed to the annulus, means carried by the annulus providing a guide in which the third arm is slidable radially and which prevents other movement of said arm, a lever pivotally attached to the annulus, a link uniting the lever to the radially slidable arm whereby movement of the lever moves the arm in and out, means for locking the lever to hold the radially slidable arm rigid in operative position, a pair of road contacting chains associated with each arm, each chain being of a length to embrace the tire loosely when the device is in use, and anchorages carried by each respective arm for positioning the opposite ends of each chain adjacent to the inner and outer side walls respectively of the tire.

2. A traction device for use with the tire of an automobile wheel, said device comprising a rigid annulus, designed to be located at the outside of and substantially coaxial with the wheel, three rigid radial arms associated with the annulus, said arms being spaced 120° apart from each other, the inner ends of two of the arms being permanently fixed to the annulus, the annulus having a rigid walled socket in which the third arm is arranged to slide radially, and which prevents other motion of said arm, a hook projecting from the slidable arm, a lever pivoted to the annulus, a link pivoted at one end to the lever, the link having a plurality of apertures selectively engageable by the hook, an actuating element fixed to the lever, a latch lug projecting from the lever and which is engageable with a part of the annulus to hold the lever in operative position, a pair of road-contacting chains associated with each arm, and anchorages carried by each respective arm for positioning the opposite ends of each chain adjacent to the inner and outer side walls respectively of the tire when the device is in use.

3. A traction device for use with the tire of an automobile wheel, said device comprising a rigid annulus, designed to be located at the outside of and substantially coaxial with the wheel, three rigid radial arms associated with the annulus, said arms being spaced equally apart from each other, the inner ends of two of the arms being permanently fixed to the annulus, means carried by the annulus providing a guide in which the third arm is slidable radially, the guide being designed to prevent other movement of said arm, a lever pivotally attached to the annulus, a link uniting the lever to the radially slidable arm whereby movement of the lever moves the arm in and out, a spring urging the arm inwardly, means for locking the lever to hold the radially slidable arm rigid in operative position, a pair of road-contacting chains associated with each arm and anchorages carried by each respective arm for positioning the opposite ends of each chain adjacent to the inner and outer side walls respectively of the tire, the chains being of such length that they extend loosely about the tire when the device is in use.

4. A traction device for use with the tire of an automobile wheel, said device comprising a rigid annulus, designed to be located at the outside of and substantially coaxial with the wheel, three rigid radial arms associated with the annulus, said arms being spaced equally apart from each other, the inner ends of two of the arms being permanently fixed to the annulus, means carried by the annulus providing a guide in which the third arm is slidable radially, a lever pivotally attached to the annulus, a link uniting the lever to the radially slidable arm whereby movement of the lever moves the arm in and out, means for locking the lever to hold the radially slidable arm in operative position, means for applying force to the lever thereby to release the locking means, each arm having opposite directed lugs constituting anchorages for the ends of road-contacting chains, a pair of chains associated with each arm, each chain being of a length such as loosely to embrace the tire tread, the opposite ends of each chain being fixed to the corresponding lugs.

GEORGE A. GRADY.
JOSEPH M. WALSH.

REFERENCES CITED

The following references are of record in the file of this patent:

UNITED STATES PATENTS

| Number | Name | Date |
| --- | --- | --- |
| 1,882,376 | Weber | Oct. 11, 1932 |
| 2,169,950 | Hamalainen | Aug. 15, 1939 |
| 2,440,863 | Liggio | May 4, 1948 |
| 2,456,544 | Varner | Dec. 14, 1948 |
| 2,474,696 | Schwab | June 28, 1949 |
| 2,503,399 | Maas | Apr. 11, 1950 |